United States Patent [19]

Tanaka

[11] Patent Number: 4,514,041
[45] Date of Patent: Apr. 30, 1985

[54] POLARIZER WITH ELECTRODE THEREON IN A LIQUID CRYSTAL DISPLAY

[75] Inventor: Hiroaki Tanaka, Habikino, Japan

[73] Assignee: Sharp Kabushiki Kaisha, Osaka, Japan

[21] Appl. No.: 501,974

[22] Filed: Jun. 13, 1983

Related U.S. Application Data

[63] Continuation of Ser. No. 181,962, Aug. 28, 1980, abandoned.

[30] Foreign Application Priority Data

Aug. 30, 1979 [JP] Japan .................. 54-119887[U]

[51] Int. Cl.³ .................................. G02F 1/13
[52] U.S. Cl. .................. 350/337; 350/398; 350/320
[58] Field of Search .............. 350/337, 341, 398; 204/192 P

[56] References Cited

U.S. PATENT DOCUMENTS

| 2,328,219 | 8/1943 | Land | 350/398 |
|---|---|---|---|
| 3,566,185 | 2/1971 | Gavin | 315/111.91 |
| 3,869,196 | 3/1975 | Kubota | 350/337 |
| 3,876,287 | 4/1975 | Sprokel | 350/339 R |
| 3,928,658 | 12/1975 | Van Boxtel et al. | 350/357 X |
| 3,966,304 | 6/1976 | Kakeda | 350/341 |
| 4,028,206 | 6/1977 | King | 204/192 P |
| 4,043,639 | 8/1977 | Matsuyama et al. | 350/337 |
| 4,046,660 | 9/1977 | Fraser | 204/192 P X |
| 4,217,160 | 8/1980 | Perregaux | 350/337 X |
| 4,248,687 | 2/1981 | Fan | 204/192 P |

FOREIGN PATENT DOCUMENTS

| 52-40871 | 10/1977 | Japan | 350/398 |
|---|---|---|---|
| 69183 | 6/1979 | Japan | 204/192 P |
| 1408966 | 10/1975 | United Kingdom . | |

Primary Examiner—John K. Corbin
Assistant Examiner—Richard F. Gallivan
Attorney, Agent, or Firm—Birch, Stewart, Kolasch and Birch

[57] ABSTRACT

A liquid crystal display cell which comprises a pair of polarizers for sealing a liquid crystal mixture. A desirable patterned electrode is formed directly on both of the pair of polarizers, preferably, by means of low-temperature sputtering techniques.

2 Claims, 4 Drawing Figures

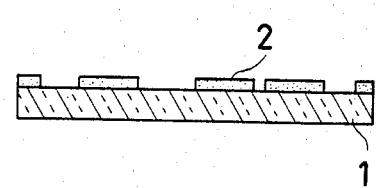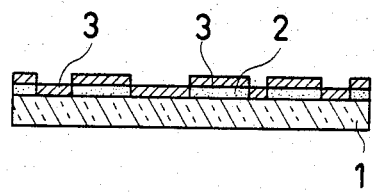
FIG. 1(a)　　　　FIG. 1(b)
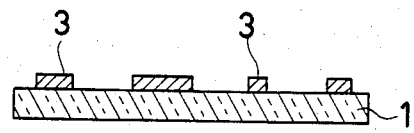
FIG. 1(c)
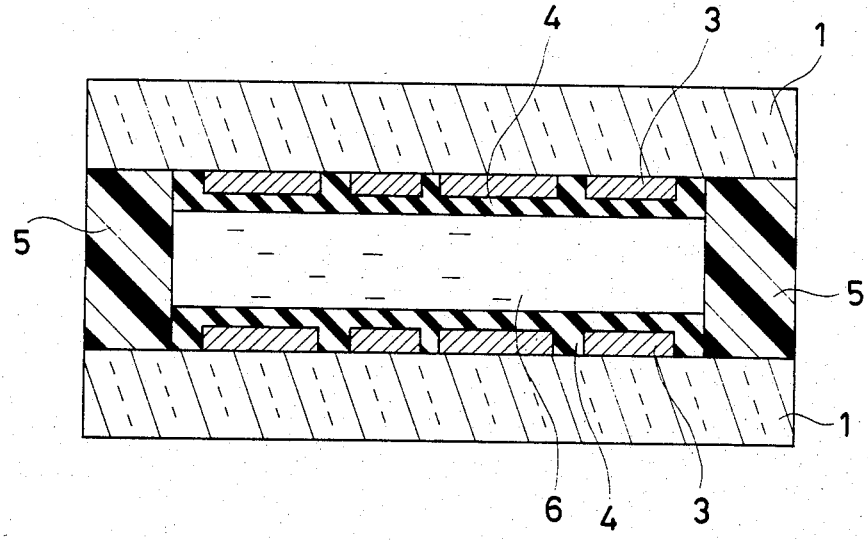
FIG. 2

POLARIZER WITH ELECTRODE THEREON IN A LIQUID CRYSTAL DISPLAY

This application is a continuation, of application Ser. No. 181,962 filed on Aug. 28, 1980 now abandoned.

BACKGROUND OF THE INVENTION

The present invention relate to a liquid crystal display cell and, more particularly, to a configuration of a liquid crystal display.

Conventional liquid crystal displays, in particular, field effect mode liquid crystal displays, require a pair of polarizers each adhered to one of a pair of substrates containing a liquid crystal mixture. A desirable patterned electrode is formed on each of the pair of substrates.

Owing to the fact that at least two pairs of substrates and polarizers were necessary, it was difficult to make the cell as thin as possible.

SUMMARY OF THE INVENTION

Accordingly, it is an object of the present invention to provide an improved structure of a liquid crystal display device.

It is another object of the present invention to provide a thin liquid crystal display cell.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a liquid crystal display cell comprises a pair of polarizers for sealing a liquid crystal mixture. A desirable patterned electrode is formed directly on each of said polarizers, preferably, by means of low-temperature sputtering techniques.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIGS. 1(a), 1(b) and 1(c) each show a cross-sectional view of one of a pair of polarizers, representing fabrication procedures for a transparent electrode pattern formed on it; and FIG. 2 shows a cross-sectonal view of a liquid crystal display device according to the present invention.

DESCRIPTION OF THE INVENTION

A main purpose of the present invention is to replace a conventional transparent substrate such as a glass plate by a polarizer to make a liquid crystal display device, in particular, a field effect mode liquid crystal display cell.

Each of FIGS. 1(a), 1(b), and 1(c) shows a cross-sectional view of one of a pair of polarizers and a transparent electrode thereon. As shown in FIG. 1(a), on one of the pair of polarizers 1, there is formed a resist 2 for inversion etching purposes. As viewed from FIG. 1(b), an electrode 3, preferably transparent, is formed on the resist 2 and the polarizer 1 by means of low-temperature sputtering techniques. As viewed from FIG. 1(c), the resist 2 is removed and accordingly the transparent electrode 3 on the resist 2 is also removed. Only the transparent electrode 3 directly on the polarizer 1 remains.

Any conventional polarizer material can be adopted for the polarizer 1 since low-temperature sputtering techniques are used to form the electrode so that there are no problems of the polarize being damaged by temperature rising. It is preferable that the polarizer 1 has properties of cutting ultra violet radiation to ensure the visibility of the display cell.

A typical polarizer adapted for the polarizer 1 comprises a layer of polyacetylcellulose (PAC) bonded to a pair of layers made of poly vinyl alcohol (PVA), colored by appropriate materials containing $I_2$. The conditions of the low-temperature sputtering preferably are $5 \times 10^{-4}$ torr at room temperature, in the case where a transparent electrode shaped as a minus-in-square has the maximum resistance ratio of about 300 $\Omega/cm^2$ and a thickness of about 800 Å. Responsive to a radiation for excitation, the wavelength of which is about 557 nm, a transmittance is obtained of about 80% or more.

FIG. 2 shows a cross-sectional view of a display cell of the present invention. In FIG. 2, there are shown an orientation film 4, a spacer 5, and a liquid crystal mixture 6. The orientation film 4 made of an insulator is used to orient molecules of the liquid crystal mixture 6. The surface of the film 4 is processed desirably by means of rubbing, or oblique evaporation method, etc. The spacer 5 made of a synthetic resin is provided for bonding the pair of polarizers 1 to each other. The material of the liquid crystal mixture 6 is conventional. Thus, a field effect mode liquid crystal display cell is completed. In this configuration, the conventional substrate such as a glass plate is removed. The display cell becomes thin as such.

While only certain embodiments of the present invention have been described, it will be apparent to those skilled in the art that various changed and modifications may be made therein without departing from the spirit and scope of the invention as claimed.

What is claimed is:

1. A method of preparing a liquid crystal display cell comprising:
   providing a pair of polarizers for sealing a liquid crystal mixture each comprising a layer of polyacetylcellulose bonded by a pair of polyvinylalcohol layers;
   forming a pattern transparent electrode having a maximum resistance ratio of about 300 $\Omega/cm^2$ and a thickness of about 800 Å on each of said polarizers by means of low-temperature sputtering at $5 \times 10^{-4}$ torr and at room temperature;
   forming an orientation film on at least one of said polarizers superimposed over said respective pattern electrode;
   bonding together said polarizers such that said pattern electrodes are in a facing relationship forming a cavity within said display cell; and
   introducing a liquid crystal mixture into said cavity between said pair of polarizers.

2. A liquid crystal display cell consisting of:
   a pair of polarizers each comprising a layer of polyacetylceluose bonded by a pair of polyvinylalcohol layers each having formed on one surface thereof by low-temperature sputtering a patterned transparent electrode having a maximum resistance ratio of about 300 Ω/cm² and a thickness of about 800 Å, at least one of said polarizers having superimposed over said transparent pattern electrode an orientation film, said polarizers being bonded together such that said patterned electrodes face each other in a manner so as to form a cavity therebetween; and a liquid crystal mixture present between said transparent electrode bearing surfaces of said polarizers within said cell cavity at least one of said polarizers exhibiting properties of cutting ultraviolet radiation.

* * * * *